United States Patent
Kurayoshi et al.

(12) 
(10) Patent No.: US 6,234,531 B1
(45) Date of Patent: May 22, 2001

(54) FUEL TANK FOR A TWO-WHEELED MOTOR VEHICLE

(75) Inventors: Yoshiyuki Kurayoshi; Noriyoshi Tsutsui, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/393,815

(22) Filed: Sep. 10, 1999

(30) Foreign Application Priority Data

Sep. 11, 1998 (JP) .................................................. 10-259042

(51) Int. Cl.$^7$ ....................................................... B62J 35/00
(52) U.S. Cl. ............................................................. 280/835
(58) Field of Search ................................... 280/830, 833, 280/834, 835; 180/219

(56) References Cited

U.S. PATENT DOCUMENTS 4,509,613 * 4/1985 Yamaguchi ........................... 180/219
4,712,637 * 12/1987 Mogi et al. ........................... 180/219
5,560,446 * 10/1996 Onishi .................................. 180/219

FOREIGN PATENT DOCUMENTS

| 63-64887 | 3/1988 | (JP) . |
| 2-28074 | 1/1990 | (JP) . |
| 4-78781 * | 3/1992 | (JP) . |
| 5-16856 * | 1/1993 | (JP) . |

* cited by examiner

*Primary Examiner*—Kevin Hurley
(74) *Attorney, Agent, or Firm*—Birch, Stewart, Kolasch & Birch, LLP (57) ABSTRACT

A recess is formed in a bottom plate of a fuel tank from above main pipes up to an upper position. An air cleaner is disposed within the recess. Side openings, which are open downward, are formed sideways of the recess. Furthermore, intake ducts are disposed respectively in the side openings. Since the bottom plate of the fuel tank is recessed from above the main pipes up to an upper position, an air cleaner is disposed within the recess, side openings are formed sideways of the recess so as to be open downward, and intake ducts are disposed in the said side openings, it is possible to ensure a sufficient fuel tank capacity.

12 Claims, 7 Drawing Sheets

FIRST COMPARATIVE EXAMPLE

Fig. 5 (b)

SECOND COMPARATIVE EXAMPLE

Fig. 5 (c)

EMBODIMENT OF THE INVENTION

FUEL TANK FOR A TWO-WHEELED MOTOR VEHICLE

BACKGROUND OF THE INVENTION

1. Field of the Invention

The present invention relates to an improvement in a fuel tank for a two-wheeled motor vehicle

2. Description of Related Art

Fuel tanks for two-wheeled motor vehicles are known. For example, "an intake introducing device in a two-wheeled motor vehicle" is disclosed in Japanese Patent Laid Open No. 28074/90 and "a frame of a two-wheeled motor vehicle" is disclosed in Japanese Patent Laid Open No. 64887/88.

In FIG. 1 of Japanese Patent Laid Open No. 28074/90, an air cleaner 9 is disposed on a main frame 6 and a fuel tank 7 is disposed so as to cover the upper surface of the air cleaner 9 from behind.

In FIG. 1 of Japanese Patent Laid Open No. 64887/88, an air cleaner 12 is mounted to a main frame member 4 and a fuel tank 15 is disposed so as to cover the upper surface and side faces of the air cleaner 12. A through window 34 is formed sideways of the fuel tank 15 for allowing hot air from an engine 9 to escape.

In the above Japanese Patent Laid Open No. 28074/90, there is no lapping of the fuel tank 7 on the side faces of the air cleaner 9. Furthermore, most of the tank capacity depends on the rear portion of the fuel tank 7. Thus, it is difficult to increase the tank capacity.

In the above Japanese Patent Laid Open No. 64887/88, the tank capacity can also depend on the side faces of the air cleaner 12 in comparison with the structure in Japanese Patent Laid Open No. 28074/90, because the fuel tank 15 is formed so as to cover the upper surface and side faces of the air cleaner. However, it is necessary that another component machined in the shape of a pipe be welded to the tank body in order to form the through window 34 sideways of the fuel tank 7. This results in the machining of the fuel tank becoming complicated and with conventional seam welding alone, it is impossible to fabricate the fuel tank.

SUMMARY OF THE INVENTION

Accordingly, it is an object of the present invention to provide a fuel tank having a sufficient tank capacity and capable of being machined easily.

In order to achieve the above-mentioned object, according to a first aspect of the present invention, a two-wheeled motor vehicle has a pair of right and left main pipes extending backward from a head pipe. The main pipes are generally rectilinear in side view, and a fuel tank is disposed above the main pipes. Furthermore, the fuel tank includes a bottom plate recessed from above the main pipes up to an upper position, an air cleaner is disposed within the recess, side openings open downward are formed in side positions of the recess, and intake ducts are disposed respectively in the side openings.

Thus, a recess is formed in the bottom plate of the fuel tank from above the main pipes up to an upper position and an air cleaner is disposed within the recess. Furthermore, side openings open downward are formed sideways of the recess, and intake ducts are disposed respectively in the side openings, whereby a sufficient capacity of the fuel tank is ensured.

In the first aspect of the present invention, it is not necessary that holes or the like be formed in side faces of the fuel tank for connection of intake passages to the air cleaner. Therefore, it is possible to facilitate the machining of the fuel tank.

A second aspect of the present invention includes cover members for covering the side openings of the recess disposed along the fuel tank.

Disposing cover members for covering the side openings of the recess along the fuel tank contributes to improvement in appearance of the two-wheeled motor vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

An embodiment of the present invention will now be described below with reference to the accompanying drawings.

In the following description, "front", "rear", "left", "right", "upper" and "lower" are directions as seen from the vehicle rider side. Further, Fr, Rr, L, and R stand for front side, rear side, left side, and right side, respectively. The drawings are to be viewed in the directions of reference numerals and marks.

Figure 1:
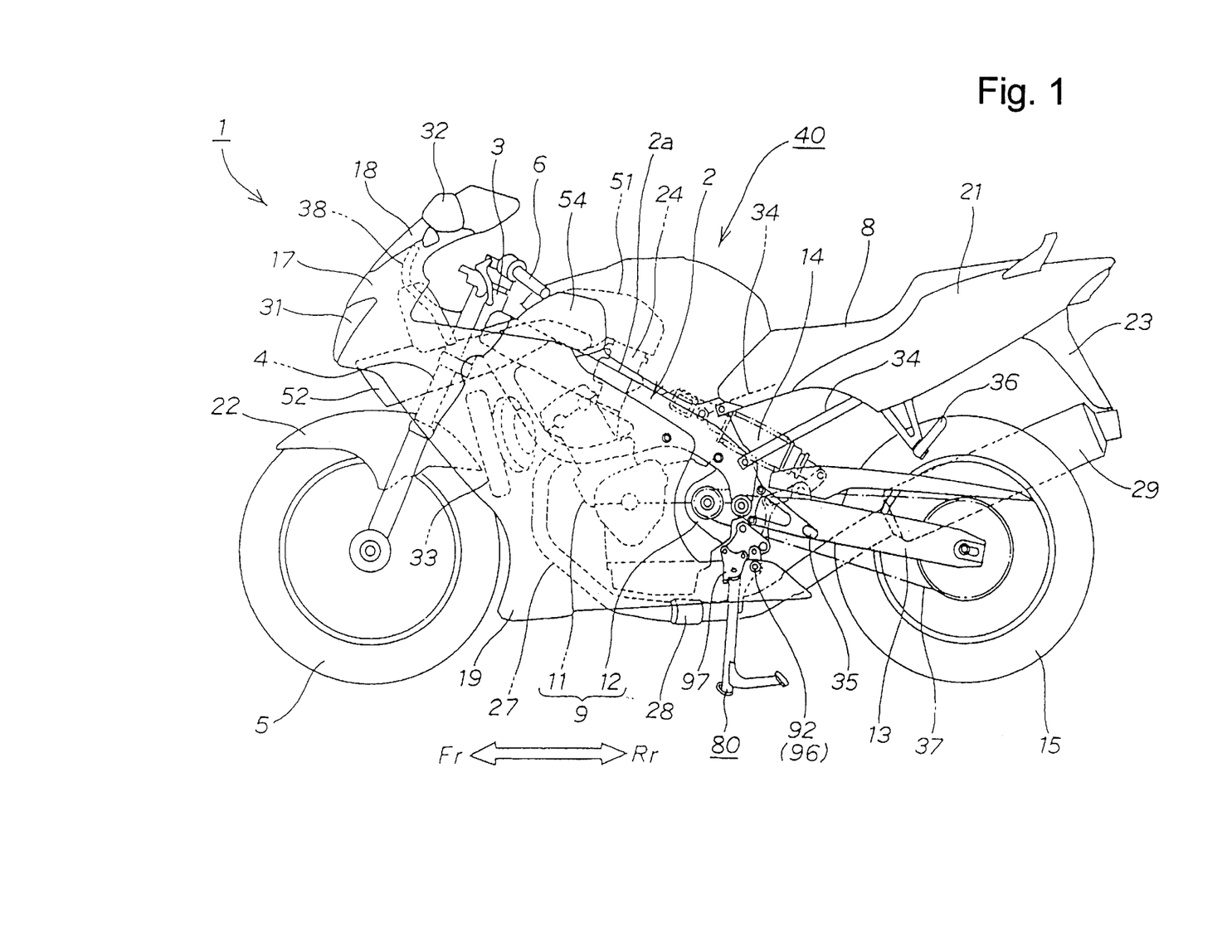
FIG. 1 is a side view of a two-wheeled motor vehicle with a fuel tank embodying the present invention mounted thereon.

FIG. 1 is a side view of a two-wheeled motor vehicle with a fuel tank embodying the invention mounted thereon. The two-wheeled motor vehicle, indicated at 1, comprises a body frame 2, a front fork 4 attached to a head pipe 3 of the body frame 2, a front wheel 5 mounted to the front fork 4, a handle 6 connected to the front fork 4, a fuel tank 40 mounted so as to straddle an upper front portion of the body frame 2, a seat 8 mounted on an upper rear portion of the body frame 2, a power unit 9 (a combination of a front engine 11 and a rear transmission 12) mounted on a lower front portion of the body frame 2, a swing arm 13 attached to a lower rear portion of the body frame 2, a rear suspension 14 for suspension of the swing arm 13 at a certain position from the body frame 2, and a rear wheel 15 connected to the rear end portion of the swing arm 13. The numeral 2a denotes a main pipe of the body frame 2. Two main pipes 2a are provided (the right main pipe 2a is not shown).

The two-wheeled motor vehicle 1 is a full cowling type vehicle provided with an upper cowl 17 which covers the upper front portion of the body frame 2, a windscreen 18 attached to the upper portion of the upper cowl 17, side cowls 19 which cover side portions of the body frame 2, a seat cowl 21 which covers the portion located under the seat 8 at the rear portion of the body frame 2, a front fender 22 which covers the front wheel 5 from above, and a rear fender 23 which covers the rear portion of the rear wheel 15 from above.

The numeral 24 denotes a carburetor, numeral 27 denotes an exhaust pipe, numeral 28 denotes a manifold, numeral 29 denotes a muffler, numeral 31 denotes a head lamp, numeral 32 a mirror, numeral 33 a radiator, numeral 34 a seat rail ( two seat rails 34 are provided), numeral 35 a rider step, numeral 36 a passenger step, numeral 37 a driving chain, numeral 38 a cowl stay, and numeral 80 a main stand which will be described later.

Figure 2:
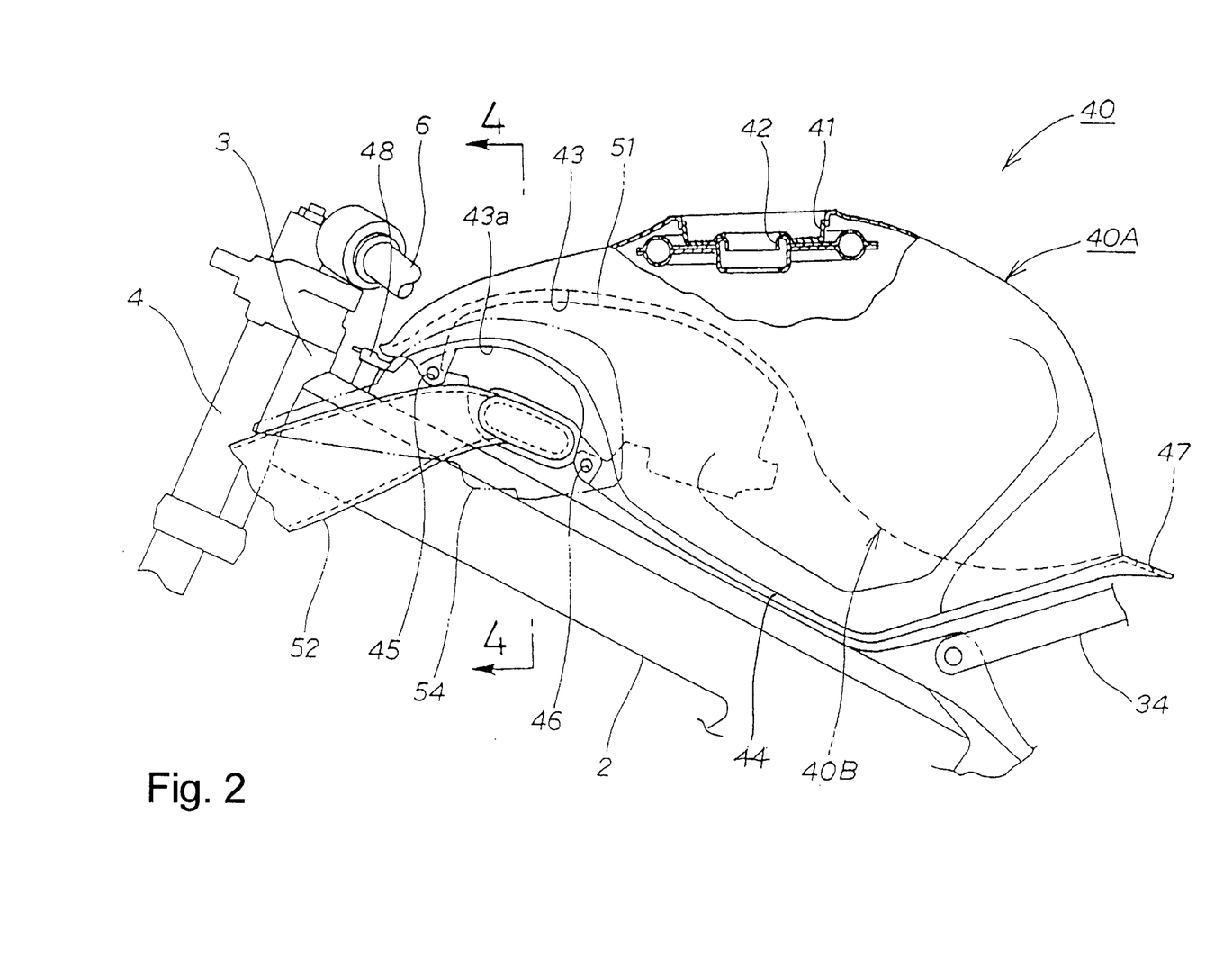
FIG. 2 is a side view showing a principal portion of the two-wheeled motor vehicle.

FIG. 2 is a side view of a principal portion of the two-wheeled motor vehicle with the fuel tank embodying the invention mounted thereon, showing components disposed around a fuel tank 40.

More specifically, the components disposed around the fuel tank 40 are an air cleaner 51 disposed below the fuel tank 40, left and right intake ducts 52, 53 (the right duct 53 is not shown), and left and right side covers 54, 55 (the right cover 55 is not shown). The left and right intake ducts 52, 53 are intake passages connected respectively to both side faces of the air cleaner 51. The left and right side covers 54, 55 are cover members which cover the fuel tank 40, air cleaner 51 and left and right intake ducts 52, 53 partially from the sides The fuel tank 40 comprises an upper member 40A and a lower member 40B combined together by seam welding. The lower member 40B is a bottom plate of the fuel tank 40. A stepped portion 41 is formed centrally in the upper portion of the fuel tank 40 and an oil supply port 42 is formed in the stepped portion 41. Furthermore, a recess 43 capable of being seen through in side view is formed in the lower front portion of the fuel tank. Tank mounting holes 45, 45 (the right mounting hole 45 is not shown) are formed in a seam-welded edge portion 44 of the upper and lower members 40A, 40B. In addition, tank mounting holes 46, 46 (the right tank mounting hole 46 is not shown) are formed in the edge portion 44, and tank mounting holes 47, 47 (the right tank mounting hole 47 is not shown) are formed in rear positions of the edge portion 44, with a stay 48 being mounted in front of the edge portion 44. Numeral 43a denotes a side opening of the recess 43. Two side openings 43a are provided (the right side opening 43a is not shown).

Figure 3:
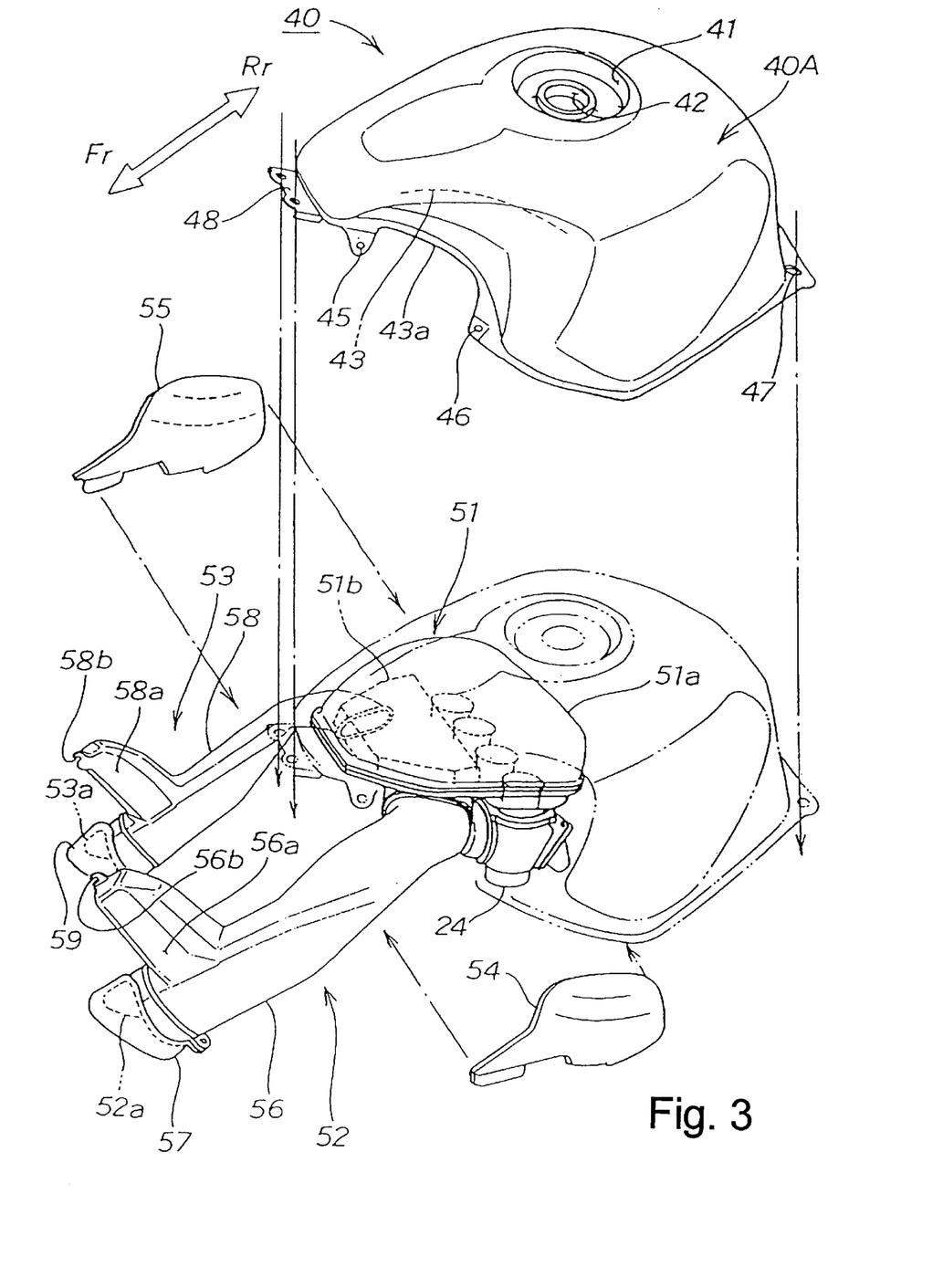
FIG. 3 is an exploded perspective view of components disposed around the fuel tank.

FIG. 3 is an exploded perspective view of components disposed around the fuel tank embodying the invention. The air cleaner 51 comprises an air cleaner case 51a and an air cleaner element 51b disposed within the air cleaner case 51a.

The left intake duct 52 comprises a duct body 56 and a front duct 57 fitted on the duct body 56 through a grille 52a. The duct body 56 is provided with an expansion chamber 56a at a position closer to the front duct 57, and a retaining piece 56b for locking to the cowl stay 38 (see FIG. 1) is formed at an outer position of the expansion chamber 56a.

The right intake duct 53 is symmetric in shape with the left intake duct 52 with respect to the longitudinal direction of the vehicle body. To be more specific, the numeral 53a denotes a grille, numeral 58 denotes a duct body, numeral 58a denotes an expansion chamber of the duct body 58, numeral 58b denotes a retaining piece of the duct body 58, and numeral 59 denotes a front duct.

The left and right side covers 54, 55, which are for covering the side openings 43a, 43a (the right side opening 43a is not shown) of the recess 43, are disposed along the fuel tank 40 to improve the appearance of the two-wheeled motor vehicle 1 (see FIG. 1).

Figure 4:
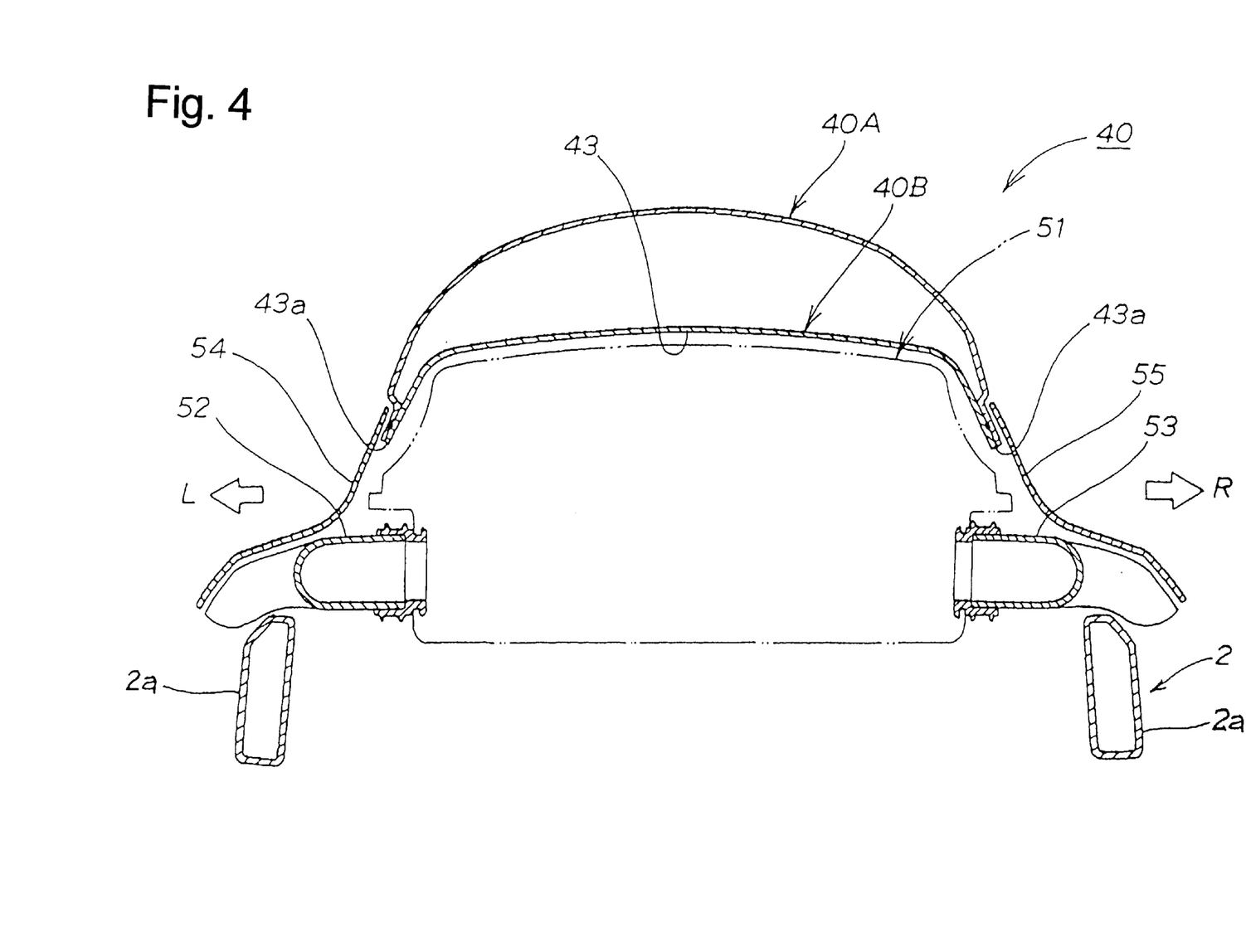
FIG. 4 is a sectional view taken on line 4—4 in FIG. 2.

FIG. 4 is a sectional view taken on line 4—4 in FIG. 2, showing a section of the fuel tank 40. The two-wheeled motor vehicle 1 (see FIG. 1) is provided with a pair of right and left main pipes 2a, 2a extending backward from the head pipe 3 and which are generally rectilinear in side view, with the fuel tank 40 being disposed on the main pipes 2a, 2a. The lower member 40B is a bottom plate of the fuel tank 40 and is formed with the recess 43 from above the main pipes 2a, 2a up to an upper position. The air cleaner 51 is disposed within the recess 43. Side openings 43a, 43a, which are open downward, are formed sideways of the recess 43, and the left and right intake ducts 52, 53 are disposed respectively in the side openings 43a, 43a.

Furthermore, the left and right side covers 54, 55 for covering the side openings 43a, 43a of the recess 43 are disposed along the fuel tank 40.

The operation of the fuel tank 40 constructed as above will now be described below, including comparative examples.

Figure 5:
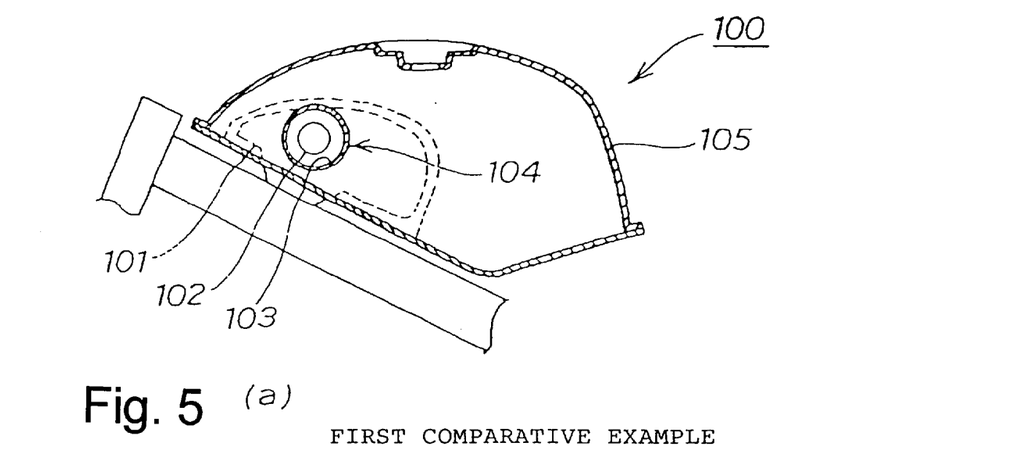
FIGS. 5(a) to 5(c) are diagrams explaining the operation of the fuel tank.

FIGS. 5(a) to 5(c) are diagrams explanatory of the operation of the fuel tank embodying the invention, of which 5(a) and 5(b) show first and second comparative examples and 5(c) shows the embodiment of the invention.

In FIG. 5(a), a fuel tank 100 shown as a first comparative example has a through hole 103 formed sideways with respect to the tank for connection of an intake duct 102 from an air cleaner 101.

It is necessary to separately provide a pipe-like component 104 and weld it to a tank body 105 to form the through hole 103 in the fuel tank 100. With seam welding alone, it is impossible to fabricate such a fuel tank, and the cost of the tank becomes high.

In FIG. 5(b), a fuel tank 110 is shown as a second comparative example, in which the connection of an intake duct 112 from an air cleaner 111 is omitted. Consequently, the tank capacity decreases by an amount corresponding to a tank portion A indicated with a double-dot chain line and thus it is impossible to ensure a sufficient tank capacity.

In FIG. 5(c) there is illustrated the fuel tank 40 of the present invention, in which the recess 43 capable of being seen through in side view is formed in the lower front portion of the fuel tank 40. Within the recess 43 are received the air cleaner 51 and portions of the left and right intake ducts 52, (53) for connection to the air cleaner, thus ensuring a sufficient capacity of the fuel tank 40.

For example, it is not necessary to form holes or the like in side faces of the fuel tank to connect the left and right intake ducts 52, 53 to the air cleaner 51,. Thus, the fuel tank can be machined easily.

Figure 6:
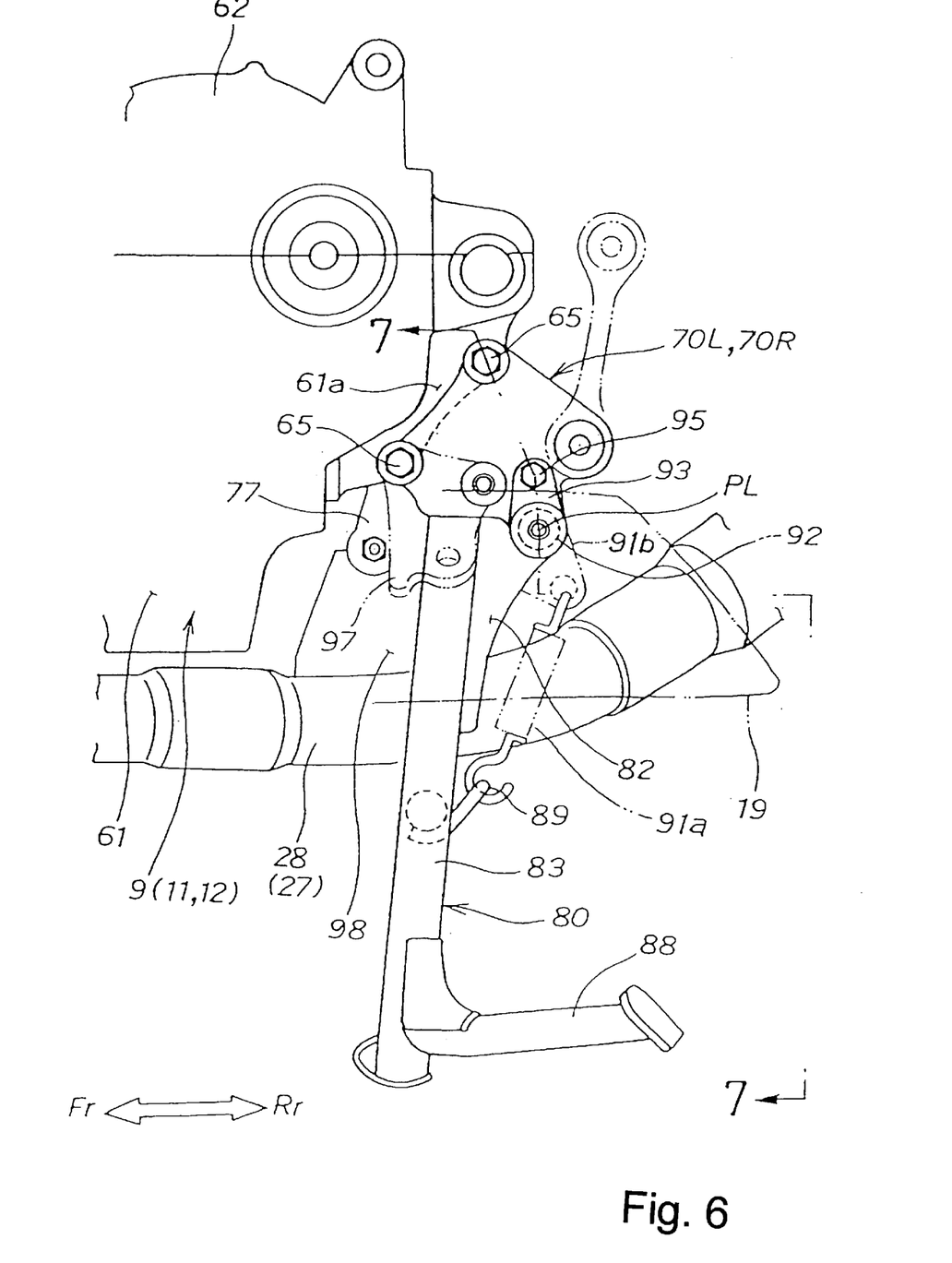
FIG. 6 is a side view of a main stand mounting structure used in the present invention.

The following description of the main stand 80 will now be provided. FIG. 6 is a side view of a main stand mounting structure used in the present invention, showing a concrete structure for mounting the main stand 80 to the engine 11.

In the engine 11, a bracket portion 61a is integral with the rear portion of a crank case 61, and left and right stand mounting brackets 70L, 70R (only the left one is shown in the figure, as is also the case with the following) are attached to the bracket portion 61*a* with two bolts and nuts 65. The main stand 80 is secured to the lower portions of the left and right stand mounting brackets 70L, 70R so as to be swingable vertically between the illustrated upright position and a sprung-up position (not shown).

A side stand bracket 97 indicated with a fictitious outline is bolted to the left stand mounting bracket 70L to mount a side stand (not shown) vertically swingably. The right stand mounting bracket 70R is provided with a bracket portion 77 for bolting an exhaust pipe hanger 98.

In the figure, the numeral 62 denotes a cylinder block, numeral 82 denotes a left gusset plate of the main stand 80, numeral 83 denotes a left leg of the main stand 80, numeral 91a denotes a spring of the main stand 80, numeral 91b a spring block, and 95 a pivot shaft mounting bolt.

Figure 7:
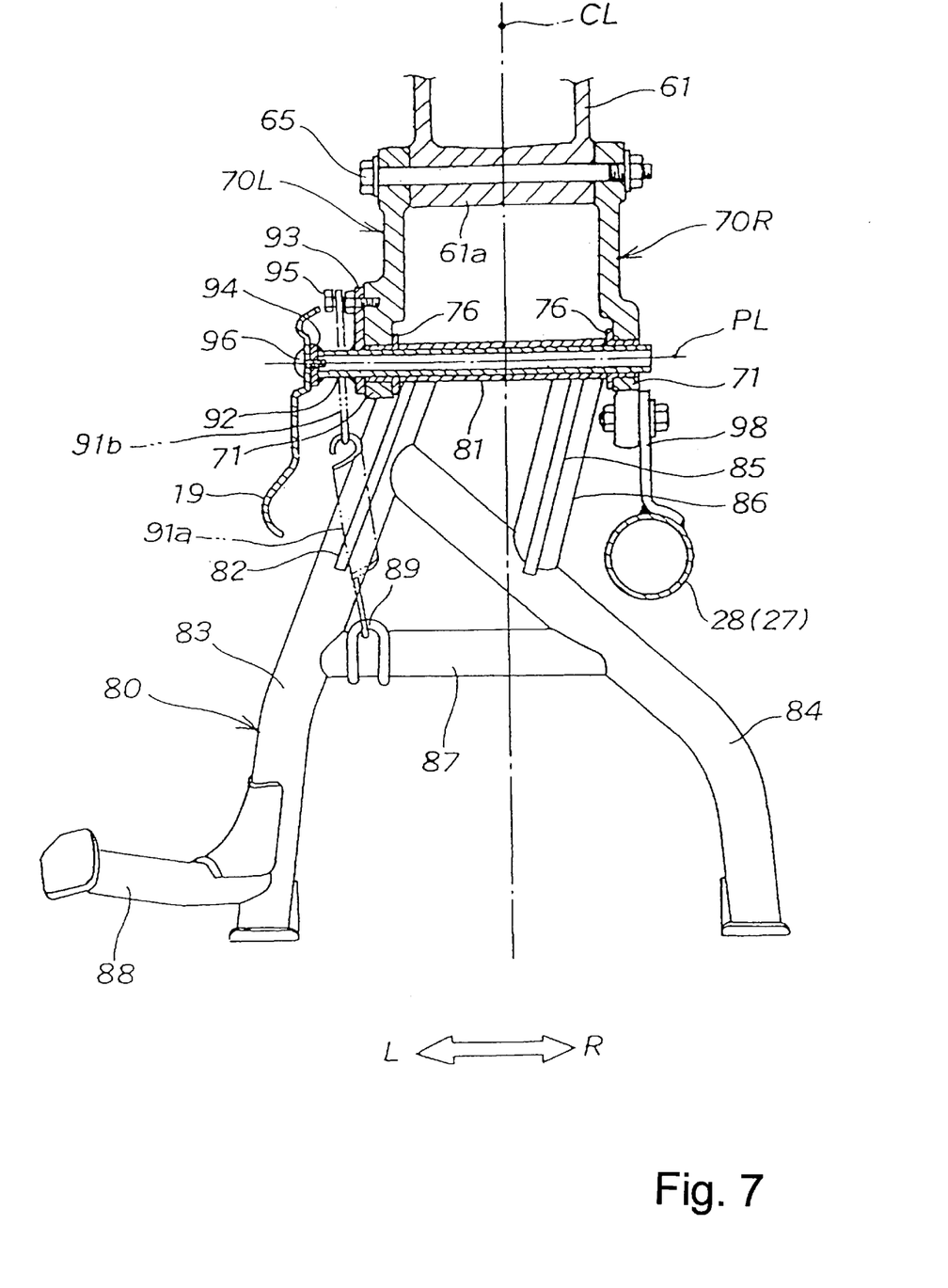
FIG. 7 is a sectional view taken on line 7—7 in FIG. 6.

FIG. 7 is a sectional view taken on line 7—7 in FIG. 6, illustrating that the stand mounting brackets 70L and 70R, which are separated left and right, have been bolted to both side faces of the bracket portion 61*a* of the crank case 61 disposed along a vehicle body center C1.

Conventional left and right stand mounting brackets 70L, 70R are of an integral structure. While the vehicle is running, this integral structure bears the load from the swing arm 13 (see FIG. 1), while during parking or stop of the vehicle, the integral structure bears the weight of the vehicle body and transmits it to the main stand 80.

To fulfill this function, the integral structure is required to have a high rigidity as a single component, thus resulting in increase of its weight. In addition, since it is an integral component, mounting seats for mounting various related members are provided on its inner surface and thus deterioration results due to machining.

In contrast therewith, the present invention includes the stand mounting brackets 70L and 70R of a left-right separated type mounted to the crank case 61 which is a highly rigid structure. A composite constituted by the crank case 61 and the left and right stand mounting brackets 70L, 70R fulfills the same function as that of the conventional integral structure.

It suffices for the left and right stand mounting brackets 70L, 70R to have a rigidity required of the aforesaid composite as mounted to the crank case 61. As a result, a lower rigidity suffices in comparison with the conventional integral structure. Consequently, it is possible to reduce the weight of the left and right stand mounting brackets and thereby reduce the material cost. Furthermore, since the number of inner surface portions to be machined is diminished, it is possible to improve the machineability and reduce the machining cost.

A concrete structure of the main stand 80 is shown in the figure being considered, i.e., FIG. 7.

According to the main stand mounting structure, a pivot pipe 81 is mounted along a pivot center PL and between mounting portions 71, 71 of the left and right stand mounting brackets 70L, 70R in a rotatable manner through a pivot shaft 92.

The pivot shaft 92, which is a pipe shaft, extends through the left and right stand mounting brackets 70L, 70R. Furthermore, a flange 93, which is integral with the pivot shaft 92, is bolted to the left stand mounting bracket 70L, thereby preventing the pivot shaft 92 from coming off the pivot pipe.

The left-hand side of the pivot shaft 92 extends outward, with a blind patch welded to the extending end. A lower rear end portion of a side cowl 19 is secured to the blind patch 94 with a screw.

According to the related art, the side cowl 19 is bolted directly to the vehicle body frame or secured to the body frame or another member through a special bracket. Direct bolting requires the provision of a new mounting portion, and the use of a special bracket causes an increase in the number of components. Both leads to an increase of cost.

In the present invention, the pivot shaft 92 for mounting the main stand 80 is used also as a mounting portion for the side cowl 19. Thus, it is not necessary to provide a new mounting portion or use a special bracket to mount the side cowl 19. Consequently, it is possible to decrease the number of components used, and thereby improve productivity and attain reduction of cost.

In the figure, the numeral 76 denotes a bushing, numeral 84 denotes a right leg of the main stand 80, numeral 85 denotes a reinforcing member for the main stand 80, and numeral 87 denotes a cross member of the main stand.

Although in the above embodiment the left and right intake ducts 52, 53 are connected to the air cleaner 51, as shown in FIG. 3, only one intake duct may be connected to the air cleaner.

The present invention constructed as above exhibits the following effects. According to the first aspect of the present invention, since the bottom plate of the fuel tank is recessed from above the main pipes up to an upper position, an air cleaner is disposed within the recess, side openings which are open downward are formed sideways of the recess, and intake ducts are disposed respectively in the side openings, it is possible to ensure a sufficient fuel tank capacity.

Furthermore, holes or the like need not be formed in side faces of the fuel tank for connecting intake passages to the air cleaner, and thus machining of the fuel tank can be done easily.

According to the second aspect of the present invention, since cover members for covering the side openings of the recess are disposed along the fuel tank, it is possible to improve the appearance of the two-wheeled motor vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A two-wheeled motor vehicle comprising:
   a pair of right and left main pipes extending backward from a head pipe, said main pipes being generally rectilinear in side view;
   a fuel tank disposed above the main pipes, said fuel tank including a bottom plate, said bottom plate including a recess formed therein, said recess extending above said main pipes up to an upper position;
   an air cleaner disposed within said recess of said fuel tank;
   side openings formed sideways of said recess, said side openings opening downwards;
   intake ducts disposed respectively in side opening; and
   cover members for covering said side openings of said recess being disposed along the fuel tank.

2. The two-wheeled motor vehicle according to claim 1, wherein said fuel tank further comprises a top plate, said top plate being connected to said bottom plate by a seam weld, and said seam weld is the only weld included on the fuel tank.

3. The two-wheeled motor vehicle according to claim 2, wherein said intake ducts are located below said seam weld of said fuel tank.

4. A The two-wheeled motor vehicle according to claim 3, wherein said side openings are partially formed by said seam weld of said fuel tank.

5. The two-wheeled motor vehicle according to claim 1, wherein said fuel tank includes a stepped portion formed at a central portion thereof, and a fuel supply port is formed in the stepped portion.

6. The two-wheeled motor vehicle according to claim 1, wherein said recess is formed in a lower front portion of said fuel tank.

7. A fuel tank for a motor vehicle, said motor vehicle including a pair of right and left main pipes extending backward from a head pipe, said main pipes being generally rectilinear in side view, said fuel tank for being disposed above the main pipes, said fuel tank comprising:

a bottom plate;

a recess formed in the bottom plate, said recess extending above said main pipes up to an upper position;

side openings formed sideways of said recess, said side openings opening downward;

wherein said recess is for receiving an air cleaner of said motor vehicle and said side openings are for receiving intake ducts of the air cleaner; and cover members for covering said side openings of said recess being disposed along the fuel tank.

8. The fuel tank for a motor vehicle according to claim 7, wherein said fuel tank further comprises a top plate, said top plate being connected to said bottom plate by a seam weld, and said seam weld is the only weld included on the fuel tank.

9. The fuel tank for a motor vehicle according to claim 8, wherein said intake ducts are locatable below said seam weld.

10. The fuel tank for a motor vehicle according to claim 9, wherein said side openings are partially formed by said seam weld.

11. The fuel tank for a motor vehicle according to claim 7, wherein said fuel tank includes a stepped portion formed at a central portion thereof, and a fuel supply port is formed in the stepped portion.

12. The fuel tank for a motor vehicle according to claim 7, wherein said recess is formed in a lower front portion of said fuel tank.

* * * * *